(12) United States Patent
Crystal

(10) Patent No.: US 11,583,939 B2
(45) Date of Patent: Feb. 21, 2023

(54) TOOL ASSEMBLY FOR A CRAFTING APPARATUS

(71) Applicant: Cricut, Inc., South Jordan, UT (US)

(72) Inventor: Jeremy Burton Crystal, Springville, UT (US)

(73) Assignee: Cricut, Inc., South Jordan, UT (US)

( * ) Notice: Subject to any disclaimer, the term of this patent is extended or adjusted under 35 U.S.C. 154(b) by 576 days.

(21) Appl. No.: 16/444,783

(22) Filed: Jun. 18, 2019

(65) Prior Publication Data

US 2020/0398404 A1 Dec. 24, 2020

(51) Int. Cl.
*B23B 31/107* (2006.01)
*B25B 1/22* (2006.01)
*B25B 5/00* (2006.01)
*B23B 31/20* (2006.01)

(52) U.S. Cl.
CPC ........ *B23B 31/1071* (2013.01); *B23B 31/201* (2013.01); *B25B 1/22* (2013.01); *B25B 5/006* (2013.01)

(58) Field of Classification Search
CPC ........ B25B 13/465; B25B 5/006; B25B 1/22; B23B 31/1071; B23B 23/0035; B23B 31/263; Y10T 82/2589; F16B 21/165
See application file for complete search history.

(56) References Cited

U.S. PATENT DOCUMENTS

| 4,762,033 | A | * | 8/1988 | Chow | B25B 23/0035 81/177.85 |
| 4,765,449 | A | * | 8/1988 | Peters | B25B 13/465 16/DIG. 30 |
| 6,044,730 | A | * | 4/2000 | Roberts | B25B 23/0035 81/177.85 |
| 6,067,881 | A | * | 5/2000 | Albertson | B25B 13/462 81/59.1 |
| 6,109,140 | A | * | 8/2000 | Roberts | B25B 23/0035 81/63 |
| 7,066,055 | B1 | * | 6/2006 | Lee | B25B 13/465 81/177.85 |
| 7,387,053 | B2 | * | 6/2008 | Lee | B25B 23/0021 81/177.1 |
| 9,132,532 | B2 | * | 9/2015 | Arnold | B25B 23/0035 |
| 10,556,327 | B2 | * | 2/2020 | Lin | F16H 31/002 |
| 2007/0214916 | A1 | * | 9/2007 | Lee | B25G 1/043 81/177.1 |
| 2010/0132517 | A1 | * | 6/2010 | Crawford | B25B 13/461 81/177.85 |
| 2013/0270778 | A1 | * | 10/2013 | Chen | B25B 5/08 279/46.7 |

* cited by examiner

*Primary Examiner* — Eric A. Gates
*Assistant Examiner* — Paul M Janeski
(74) *Attorney, Agent, or Firm* — Honigman LLP

(57) ABSTRACT

A tool assembly includes a housing, a shaft, a spherical member, and a head. The housing defines a shaft channel. The shaft is rotatably disposed within the shaft channel and includes an exposed portion outside of the shaft channel. The exposed portion defines an engagement channel extending through an outer surface of the exposed portion. The spherical member is disposed within the engagement channel. The head is configured to be engaged with the exposed portion of the shaft. The head includes a detent configured to selectively engage the spherical member.

13 Claims, 11 Drawing Sheets

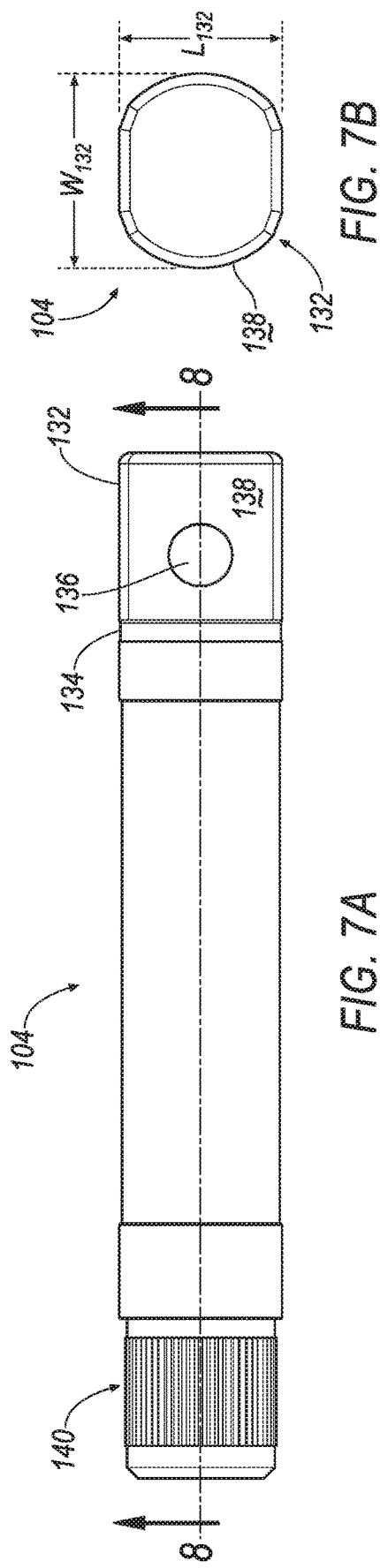
FIG. 7A
FIG. 7B
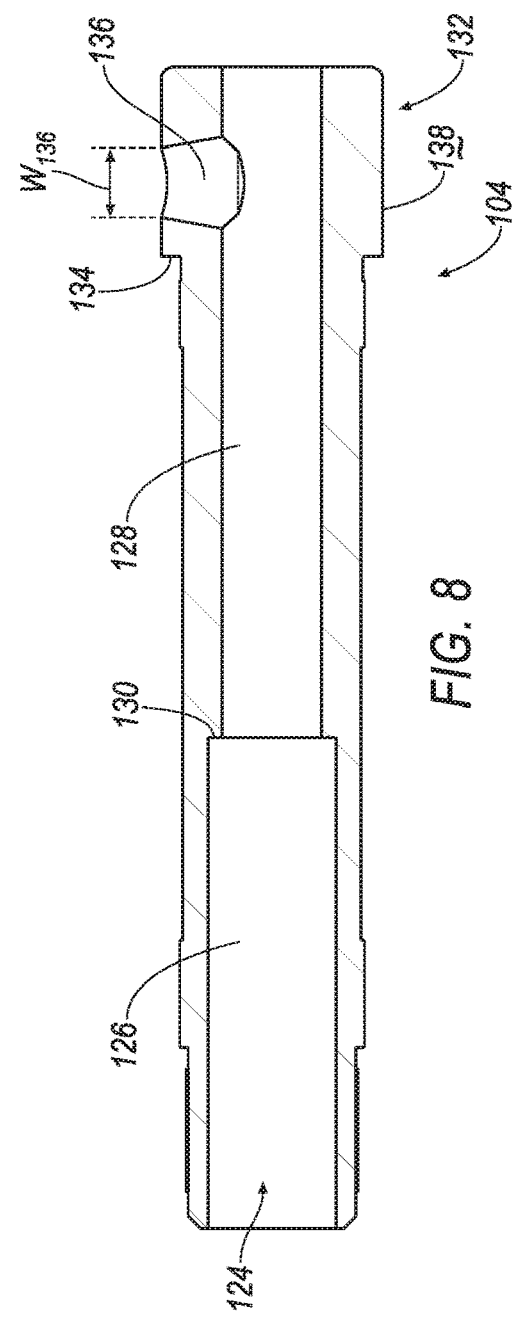
FIG. 8

TOOL ASSEMBLY FOR A CRAFTING APPARATUS

TECHNICAL FIELD

This disclosure relates to crafting apparatus assemblies, systems, devices, kits, mechanisms, and methodologies for utilizing the same.

BACKGROUND

Crafting apparatuses are known. While existing crafting apparatuses perform adequately for their intended purpose, improvements to crafting apparatuses are continuously being sought in order to advance the arts.

SUMMARY

One aspect of the disclosure provides a tool assembly for a crafting apparatus. The tool assembly includes a housing, a shaft, a spherical member, and a head. The housing defines a shaft channel. The shaft is rotatably disposed within the shaft channel and includes an exposed portion outside of the shaft channel. The exposed portion defines an engagement channel extending through an outer surface of the exposed portion. The spherical member is disposed within the engagement channel. The head is configured to be engaged with the exposed portion of the shaft. The head includes a detent configured to selectively engage the spherical member.

Implementations of the disclosure may include one or more of the following optional features. In some implementations, the tool assembly includes a plunger slidably disposed within a plunger channel defined by the shaft. The plunger may be engaged with the spherical member and the plunger channel may be connected to the engagement channel.

In some examples, the plunger includes a first portion having a first diameter and a second portion having a second diameter less than the first diameter, the first portion and the second portion being configured to selectively engage the spherical member. The first portion of the plunger may be engaged with the spherical member. A portion of the spherical member may extend past the outer surface of the exposed portion of the shaft. The second portion of the plunger may be engaged with the spherical member. The spherical member may be disposed within the outer surface of the exposed portion of the shaft.

In other examples, the plunger may be operable between a locked position where a portion of the spherical member extends past the outer surface of the exposed portion of the shaft and an unlocked position where the spherical member is disposed within the outer surface of the exposed portion of the shaft.

In some instances, the tool assembly includes a spring exerting a biasing force upon the plunger to bias the plunger to the locked position. The plunger may be moved from the locked position to the unlocked position in response to a force sufficient to overcome the biasing force of the spring.

In some configurations, the tool assembly includes a gear configured to drive rotation of the shaft relative to the housing. The tool assembly may include a damping member disposed around the shaft. The damping member may be configured to impede rotation of the shaft.

In some implementations, the detent includes two engagement surfaces extending from each other at an angle, and when the detent engages the spherical member, the spherical member simultaneously contacts the two engagement surfaces. When the detent engages the spherical member, the spherical member may contact the head at only the two engagement surfaces. The spherical member may exert a force upon the two engagement surfaces in a radially outward direction, such that the spherical member is wedged between the two engagement surfaces.

Another aspect of the disclosure provides a device for a crafting apparatus including a main body extending from a first end to a second end, means for engaging a drive mechanism at the first end of the main body, and means for manipulating a sheet-like medium at the second end of the main body.

Implementations of the disclosure may include one or more of the following optional features. In some implementations, the main body includes an inner surface defining a recess, the inner surface configured to engage the drive mechanism. The inner surface may define a detent configured to engage a protruding portion of the drive mechanism. The inner surface may be configured to engage the drive mechanism via a keyed connection.

In some examples, the means for manipulating the medium are integrally formed with the main body.

In other examples, the means for manipulating the medium are selectively engageable with the main body.

In some instances, the means for manipulating the medium are selectively engageable with the main body via a mechanical fastener.

Another aspect of the disclosure provides a tool housing for a crafting apparatus. The tool housing includes an exposed portion and a head. The exposed portion has a spherical member. The head is configured to be engaged with the exposed portion. The head includes a detent configured to selectively engage the spherical member.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 7A is a side elevation view of a shaft of the tool assembly of FIG. 2.

FIG. 7B is a bottom elevation view of the shaft of FIG. 7A.

FIG. 8 is a cross-sectional view of the shaft of FIG. 7A, taken along line 8-8 in FIG. 7A.

Like reference symbols in the various drawings indicate like elements.

DETAILED DESCRIPTION

Figure 1:
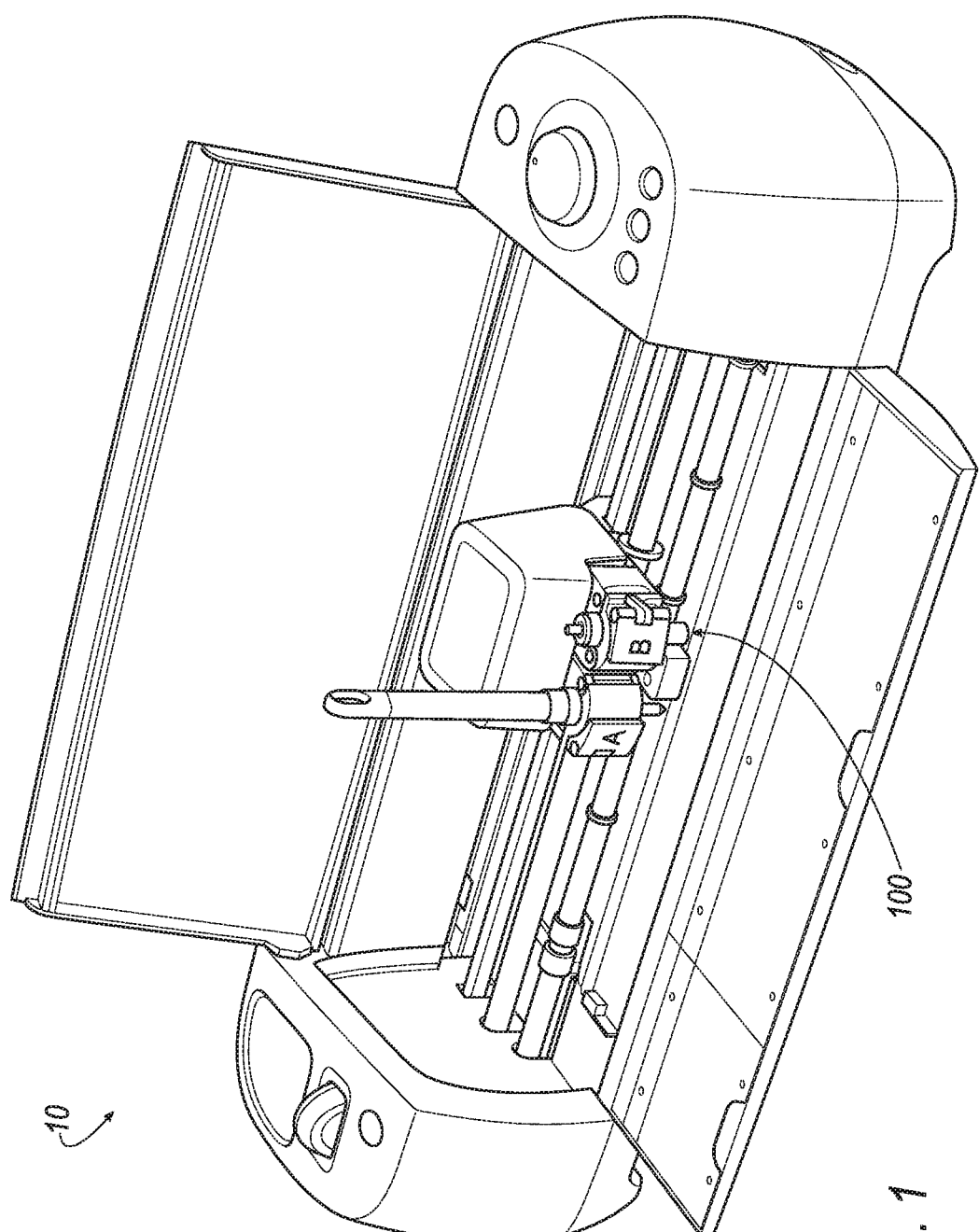
FIG. 1 is a perspective view of a crafting apparatus.

Referring to FIG. 1, a crafting apparatus 10 is generally shown. The crafting apparatus 10 may be powered by electricity and may be configured to manipulate and/or influence a plurality of mediums, including, but not limited to, paper, cardboard, nylon, vinyl, wood, metal, plastic, etc. In some implementations, the mediums may be substantially sheet-like or planar. In other implementations, the mediums may have any suitable configuration. The crafting apparatus 10 may influence these mediums in any suitable manner, including, but not limited to, cutting, painting, marking, bending, creasing, scoring, etc. A user may operate and provide instructions to the crafting apparatus 10 to influence the medium. In some implementations, the crafting apparatus 10 is in electrical communication with a user device (not shown) configured to receive input(s) from the user and transmit the input(s) to the crafting apparatus 10 to achieve a desired result or output. The user device may be, for example, a computer, a smartphone, a tablet device, etc.

Figure 2:
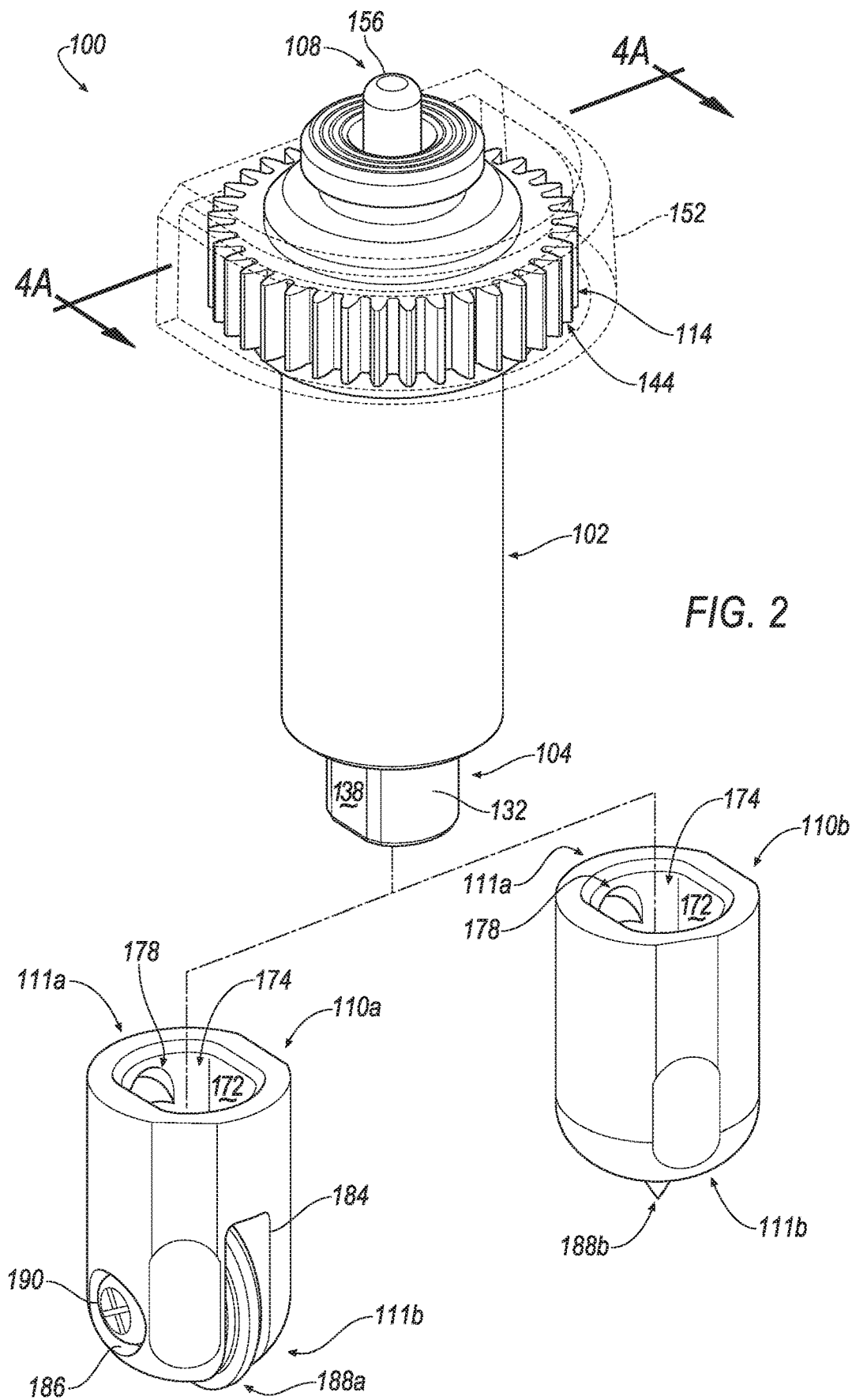
FIG. 2 is a tool assembly of the crafting apparatus of FIG. 1 in accordance with principles of the present disclosure.
Figure 3:
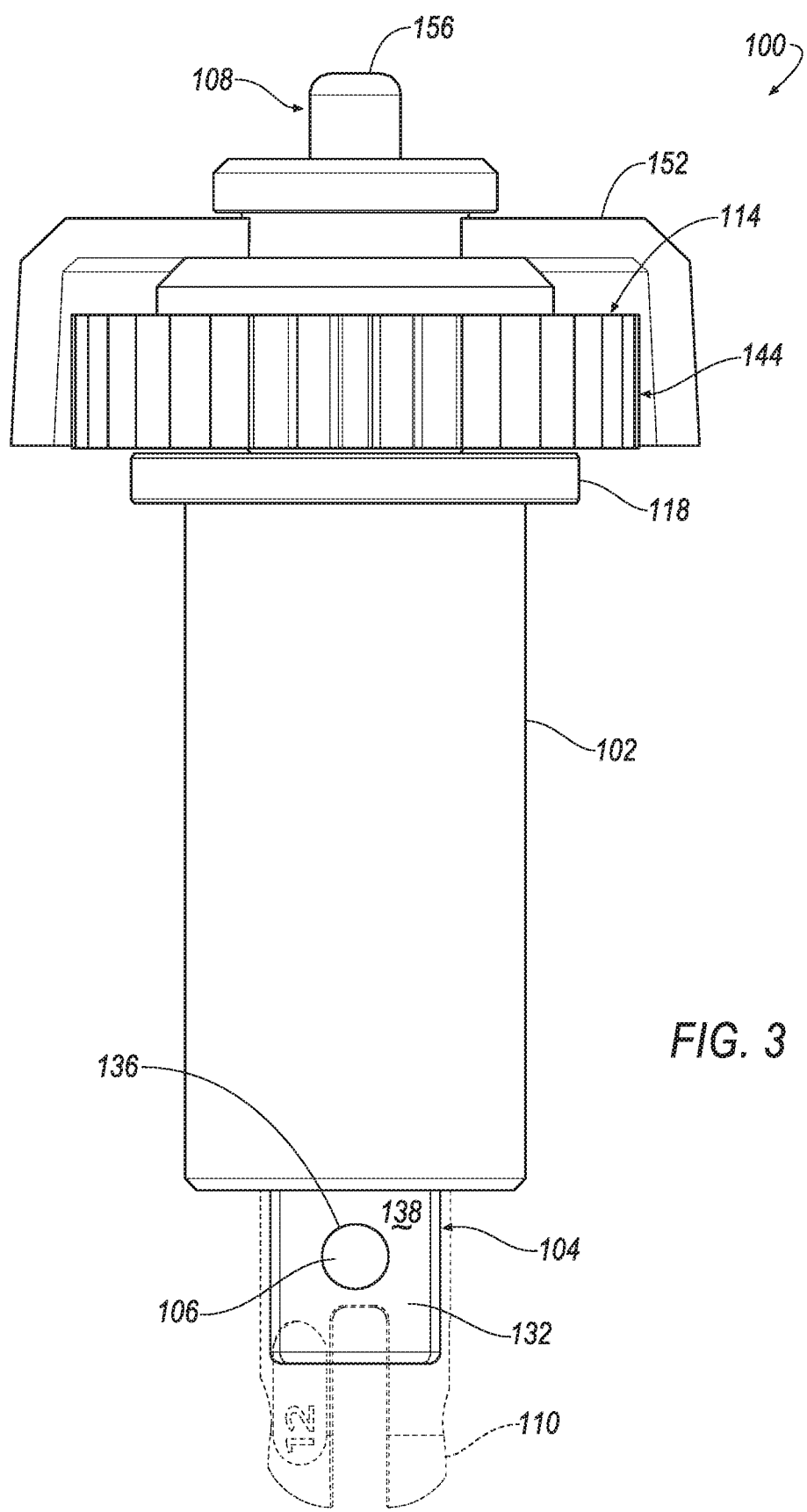
FIG. 3 is a plan view of the tool assembly of FIG. 2.

Referring to FIGS. 1 and 2, the crafting apparatus 10 includes a tool assembly 100. The tool assembly 100 may be configured to manipulate and/or influence the plurality of mediums as set forth above. As will become apparent, certain components of the tool assembly 100 may be interchangeable to modify the manner in which the medium is influenced. These interchangeable components may be disposable, reusable, or some combination of the two. The tool assembly 100 includes a housing 102, a shaft 104, a spherical member 106, a plunger 108, a head 110, a spring 112, and a gear 114. In some implementations, each of the components of the tool assembly 100 may be formed as discrete components, unitary components, or some combination of the two. Each of the components of the tool assembly 100 may be formed of any suitable material, such as, for example, plastic, aluminum, steel, brass, carbon fiber, rubber, etc.

Referring to FIGS. 2-4A, the housing 102 may be a generally cylindrical member. The housing 102 may be fixed to the crafting apparatus 10 in any suitable manner. The housing 102 defines a shaft channel 116 extending through an entire length of the housing 102. In other implementations, the shaft channel 116 may extend through only a portion of the housing 102. The shaft channel 116 may be configured to receive the shaft 104, i.e., a diameter of the shaft channel 116 may be greater than an outer diameter of the shaft 104. The housing 102 may include a flange 118 at one end of the housing 102. The flange 118 may extend radially outwardly from the housing 102 and may engage the gear 114. The housing 102 may define lips 120a, 120b configured to engage washers 122a, 122b, respectively. The lips 120a, 120b may be disposed within the shaft channel 116 and may be defined by portions of the shaft channel 116 that have greater diameters than the rest of the shaft channel 116.

Referring to FIGS. 4A and 6-8, the shaft 104 may be a generally cylindrical member. The shaft 104 is rotatably disposed within the shaft channel 116 of the housing 102. The shaft 104 defines a plunger channel 124 extending through an entire length of the shaft 104. The plunger channel 124 may include an upper channel 126, a lower channel 128, and a lip 130 between the upper channel 126 and the lower channel 128. As can be seen in FIG. 8, the upper channel 126 may have a diameter greater than a diameter of the lower channel 128. The upper channel 126 may be configured to receive the plunger 108 and the spring 112, and the lower channel 126 may be configured to receive the plunger 108. The lip 130 may engage the spring 112, as described in greater detail below.

The shaft 104 includes an exposed portion 132 at one end of the shaft 104. When the shaft 104 is disposed in the shaft channel 116 of the housing 102, the exposed portion 132 is outside of the shaft channel 116. The shaft 104 includes a lip 134 extending around at least a portion of the shaft 104 that extends outwardly from a center of the shaft 104. The lip 134 has a width greater than a diameter of the shaft channel 116, such that the lip 134 abuts the housing 102 and prevents the exposed portion 132 from entering into the shaft channel 116. The exposed portion 132 defines an engagement channel 136 extending from the plunger channel 124 through an outer surface 138 of the exposed portion 132. For example, the engagement channel 136 may be connected or in fluid communication with the plunger channel 124. The engagement channel 136 has a width $W_{136}$ where the engagement channel 136 meets the outer surface 138 of the exposed portion 132. The engagement channel 136 (e.g., the surfaces defining the engagement channel 136) may taper toward the outer surface 138. That is, the engagement channel 136 may be wider near the plunger channel 124 than near the outer surface 138. The engagement channel 136 may extend transversely to the plunger channel 124. For example, the engagement channel 136 may extend at a right angle with respect to the plunger channel 124.

Referring to FIG. 7B, a plan view of an end of the exposed portion 132 of the shaft 104 is shown. The exposed portion 132 may have an outline resembling an oval. In some implementations, the exposed portion 132 has an outline resembling a "D" on one side and a backwards "D" on the other side. Accordingly, the outline of the exposed portion 132 may be referred to as a "double-D" configuration. As shown in FIG. 7B, the outline of the exposed portion 132 may have a length $L_{132}$ and a width $W_{132}$ greater than the length $L_{132}$.

The shaft 104 includes a first connection arrangement 140 on an outer surface of the shaft 104 at an end opposite the exposed portion 132. In some implementations, the first connection arrangement 140 may be a plurality of teeth. In other implementations, the first connection arrangement 140 may be part of a keyed connection, a fastener connection, etc. The gear 114 includes a second connection arrangement 142 on an inner surface of the gear 114 configured to engage the first connection arrangement 140. In some implementations, the second connection arrangement 142 may be a plurality of teeth configured to meshingly engage the first connection arrangement 140. In other implementations, the second connection arrangement 142 may be part of a keyed connection, a fastener connection, etc., with the first connection arrangement 140. The gear 114 may drive rotation of the shaft 104 relative to the housing 102 via the engagement of the first connection arrangement 140 and the second connection arrangement 142.

Referring to FIGS. 2-4A, the gear 114 includes a plurality of teeth 144 configured to engage teeth of a corresponding gear (not shown) of the crafting apparatus 10. The gear of the crafting apparatus 10 may be rotationally driven by a motor (not shown) which, in turn, may drive rotation of the gear 114. As the gear 114 rotates, the shaft 104 likewise rotates via the engagement of the first connection arrangement 140 and the second connection arrangement 142.

Figure 4A:
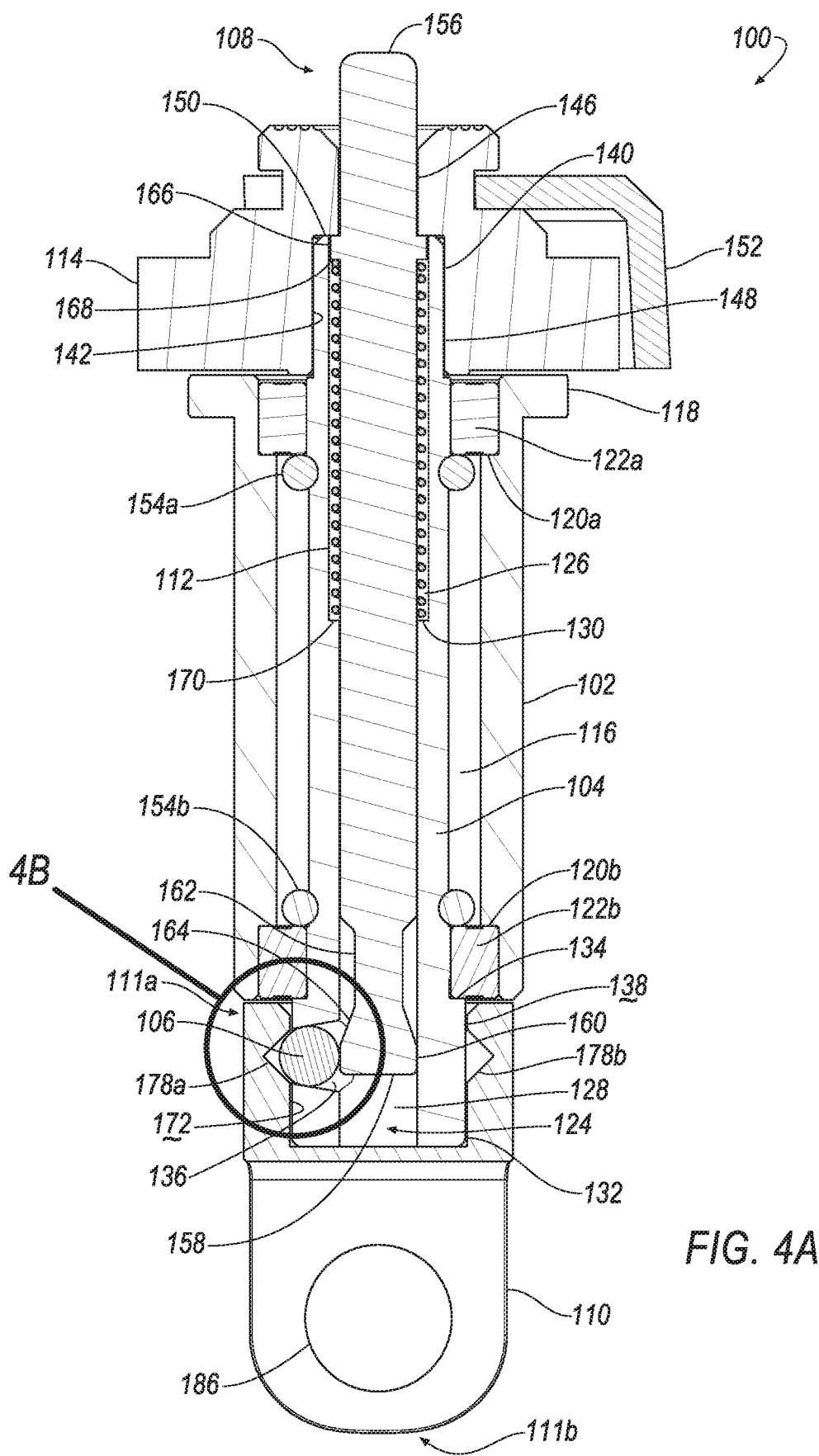
FIG. 4A is a cross-sectional view of the tool assembly in a first position of FIG. 2, taken along line 4A-4A in FIG. 2.

The gear 114 defines an upper channel 146, a lower channel 148, and a lip 150 between the upper channel 146 and the lower channel 148. As can be seen in FIG. 4A, the upper channel 146 may have a diameter less than a diameter of the lower channel 148. The upper channel 146 may be sized to receive the plunger 108 and the lower channel 148 may be sized to receive the shaft 104, the plunger 108, and the spring 112. Consequently, the gear 114 may abut the flange 118 of the housing 102 with the lower channel 148 disposed closer to the housing 102 than the upper channel 146.

Figure 6:
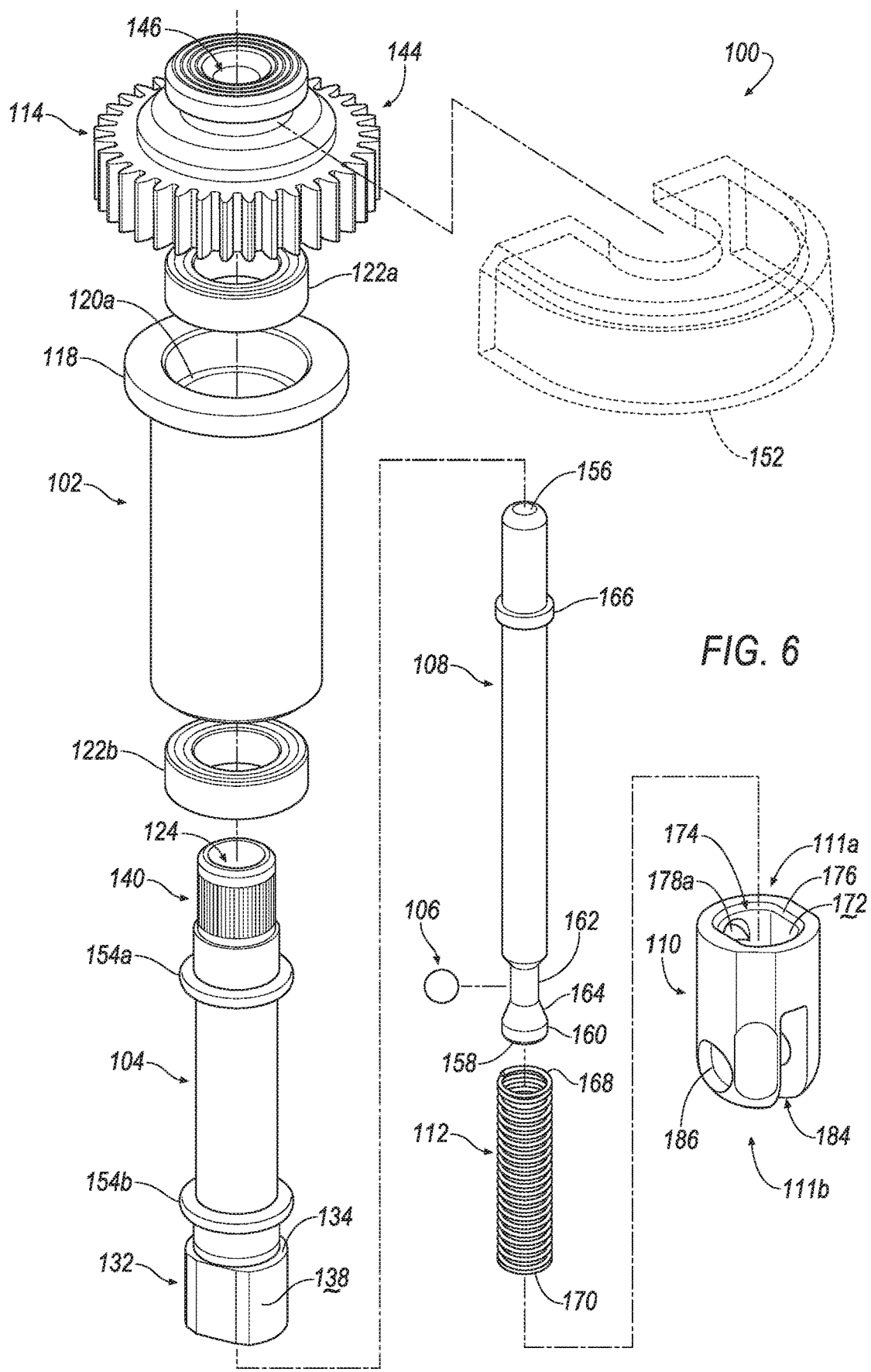
FIG. 6 is an exploded perspective view of the tool assembly of FIG. 2.

Referring to FIGS. 2 and 6, in some implementations, the tool assembly 100 includes a shroud 152 surrounding a portion of the teeth 144 of the gear 114. The shroud 152 may be a generally U-shaped member such that an exposed portion of the teeth 144 may engage the teeth of the corresponding gear of the crafting apparatus 10 and the remaining portion of the teeth 144 are covered by the shroud 152. The shroud 152 may be configured to reduce the risk of undesired obstruction (from e.g., fingers of a user, debris, a medium) with the teeth 144.

Referring to FIGS. 4A and 6, in some implementations, the tool assembly 100 includes the washers 122a, 122b disposed around the shaft 104 in the shaft channel 116 of the housing 102. The first washer 122a may engage the first lip 120a of the housing 102, and the second washer 122b may engage the second lip 120b of the housing 102. The washers 122a, 122b may be secured to the housing 102, the shaft 104, or both the housing 102 and the shaft 104. In other implementations, the washers 122a, 122b may be frictionally engaged with the housing 102 and the shaft 104, and may not be secured to either of the housing 102 or the shaft 104.

With continued reference to FIGS. 4A and 6, in some implementations, the tool assembly 100 includes damping O-rings 154a, 154b disposed around the shaft 104. The damping O-rings 154a, 154b may be secured to the shaft 104, or the damping O-rings 154a, 154b may be disposed around the shaft 104 via a friction fit. The damping O-rings 154a, 154b may be configured to reduce backlash caused by gaps between the first connection arrangement 140 and the second connection arrangement 142 or gaps between the teeth 144 of the gear 114 and the teeth of the corresponding gear of the crafting apparatus 10. The damping O-rings 154a, 154b may be secured to an outer surface of the shaft 104 and may frictionally engage the washers 122a, 122b such that as the shaft 104 rotates, the damping O-rings 154a, 154b may slightly impede rotation of the shaft 104. The damping O-rings 154a, 154b are configured to improve accuracy and precision of the rotation of the shaft 104.

Figure 9:
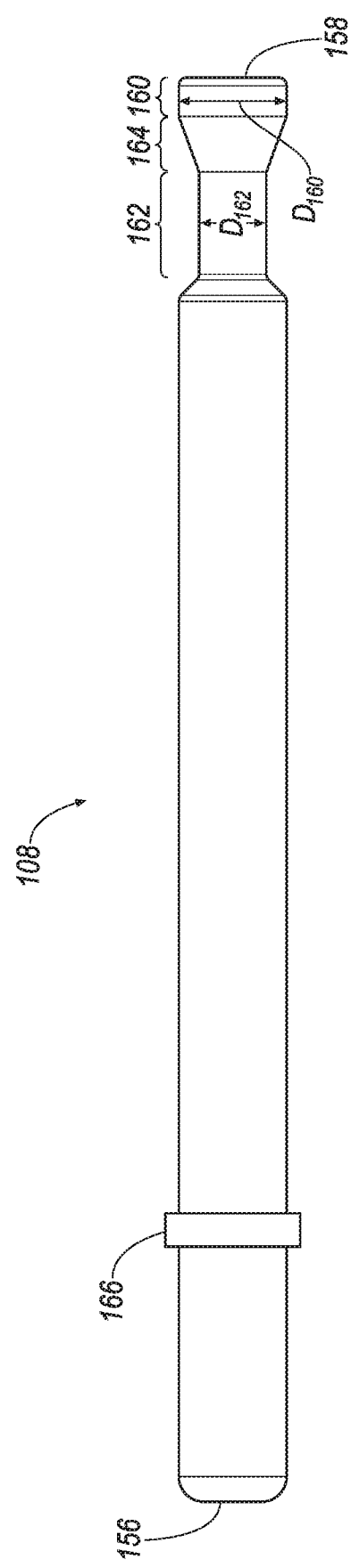
FIG. 9 is a side elevation view of a plunger of the tool assembly of FIG. 2.
Figure 10A:
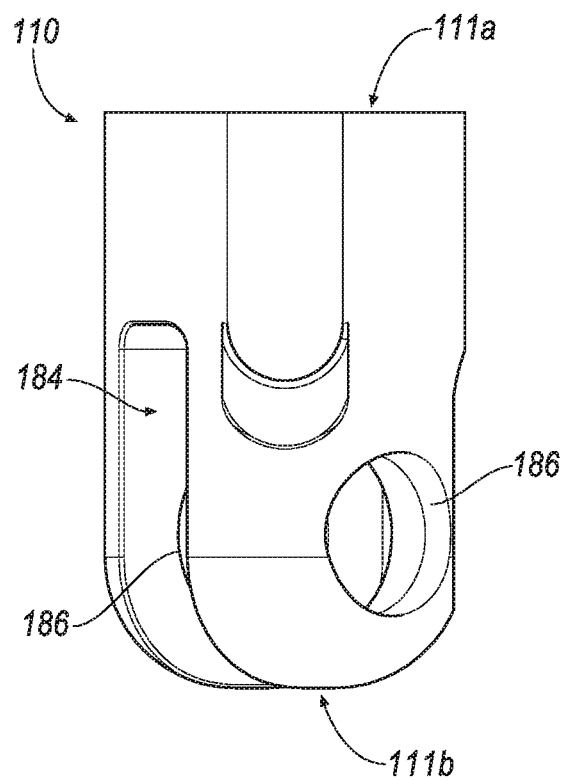
FIG. 10A is a side elevation view of a head of the tool assembly of FIG. 2.

Referring to FIGS. 4A and 9, the plunger 108 is slidably disposed within the plunger channel 124. The plunger 108 is a generally cylindrical member extending from a proximal end 156 to a distal end 158. The plunger 108 includes a head portion 160, a neck portion 162, and an intermediate portion 164 extending from the head portion 160 to the neck portion 162. The head portion 160 has a head diameter $D_{160}$ and the neck portion 162 has a neck diameter $D_{162}$ less than the head diameter $D_{160}$. As can be seen in FIG. 4A, the head diameter $D_{160}$ may be equal to or slightly less than a diameter of the plunger channel 124. The intermediate portion 164 may be angled toward a center of the plunger 108 and may have a greater diameter closer to the head portion 160 than the neck portion 162.

The plunger 108 includes a ring 166 disposed around the plunger 108 near the proximal end 156. The ring 166 may be formed separately and secured to the plunger 108 or the ring 166 may be integrally formed with the plunger 108. One side of the ring 166 may engage the lip 150 of the gear 114 such that the ring 166 resists a transverse motion of the plunger 108 along a direction from the distal end 158 to the proximal end 156. The other side of the ring 166 may engage the spring 112.

Referring to FIGS. 4A and 6, the spring 112 may be disposed around the plunger 108 within the plunger channel 124. Specifically, the spring 112 may be disposed within the upper channel 126 of the plunger channel 124. The spring 112 extends from a proximal end 168 to a distal end 170. The proximal end 168 may engage the ring 166 of the plunger 108 and the distal end 170 may engage the lip 130 of the shaft 104 between the upper channel 126 and the lower channel 128. The spring 112 may be compressible between the ring 166 and the lip 130. For example, the tool assembly 100 may be operable between a locked position (shown in FIG. 4A) and an unlocked position (shown in FIG. 5). The spring 112 may exert a biasing force upon the ring 166 of the plunger 108 to bias the ring 166 into engagement with the lip 150 of the gear 114 in the locked position. That is, the lip 150 of the gear 114 may resist a transverse motion of the plunger 108 along a direction from the distal end 158 to the proximal end 156. The spring 112 may be compressed to the unlocked position in response to an input force sufficient to overcome the biasing force of the spring 112. The input force may be exerted on the proximal end 156 of the plunger 108 and may be caused by a user, a mechanical mechanism, an electronic mechanism, an electro-mechanical mechanism, etc. The spring 112 may be any suitable mechanism, including a helical compression spring, a conical spring, a disc or Belleville spring, etc.

Figure 4B:
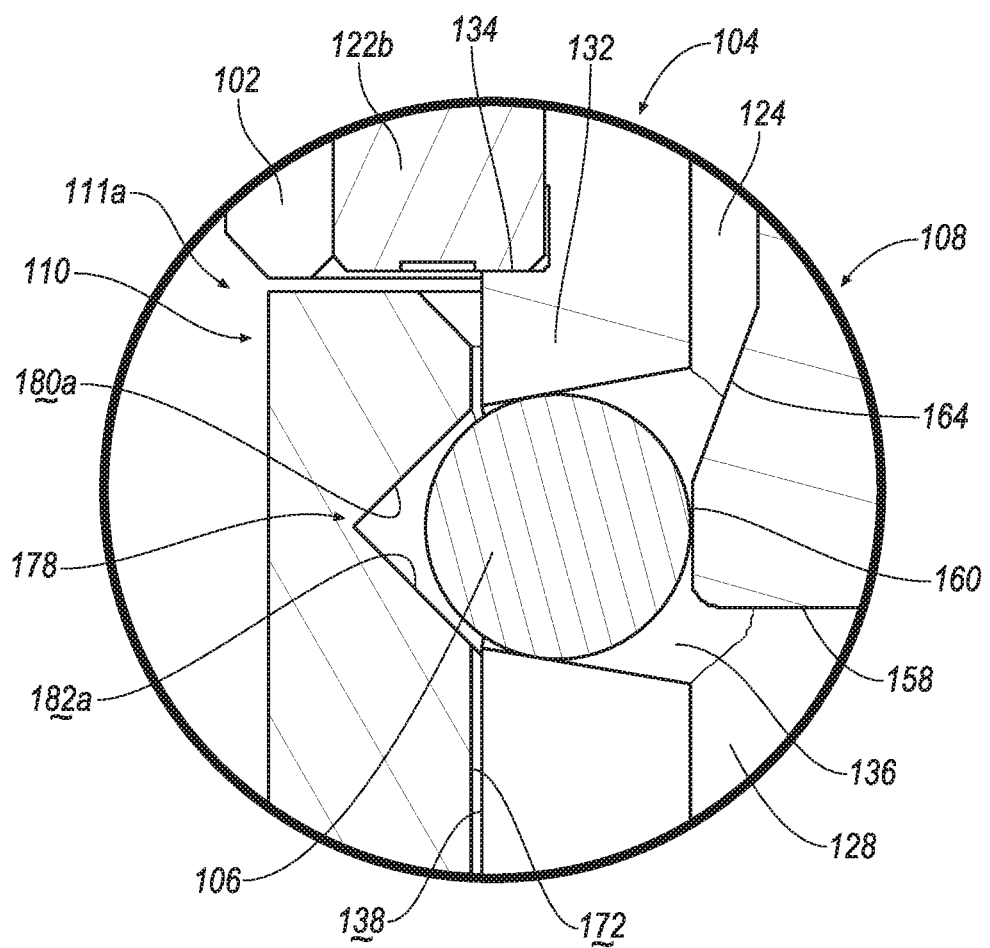
FIG. 4B is a detail view of a portion of the tool assembly of FIG. 4A.
Figure 5:
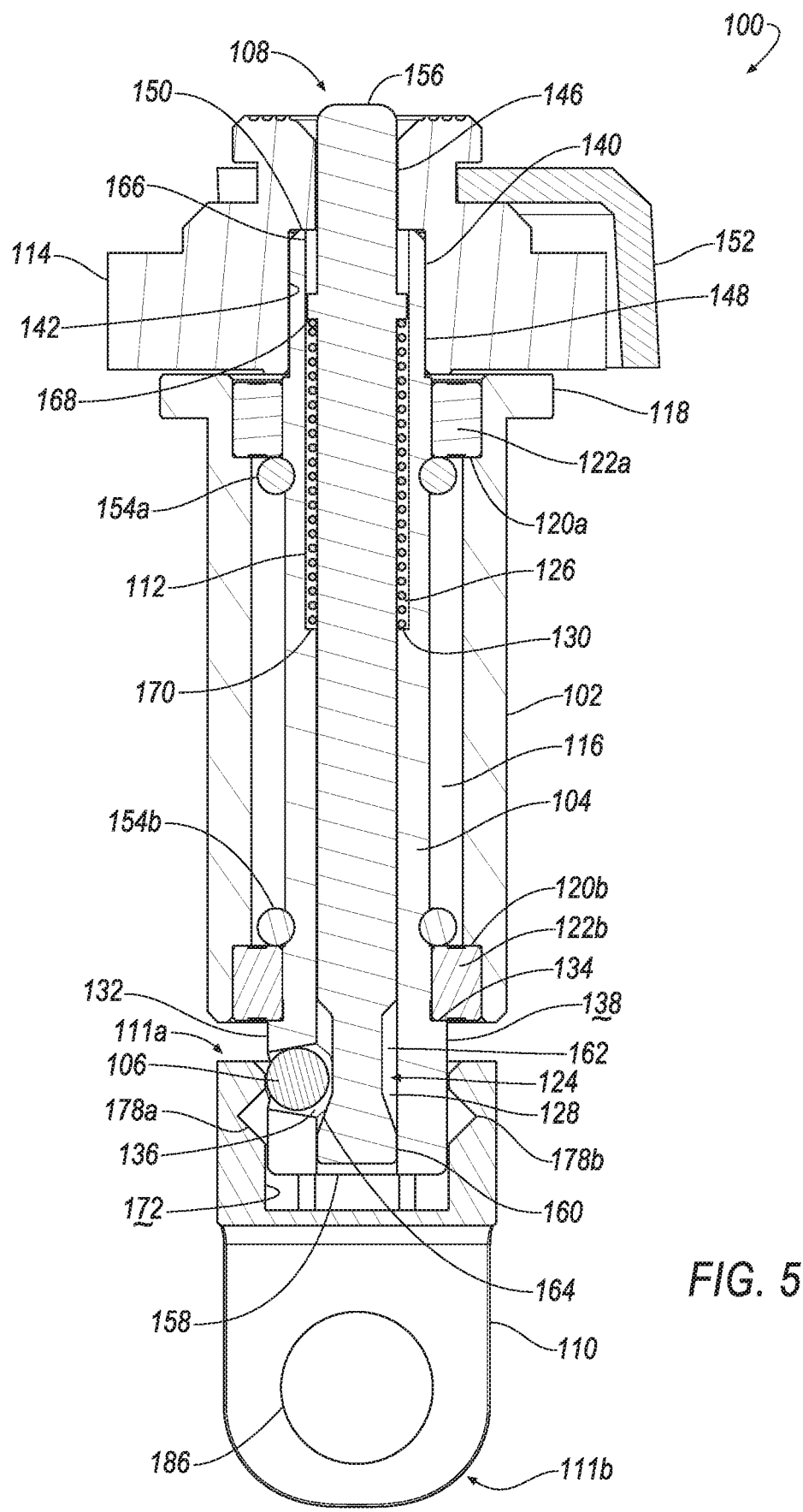
FIG. 5 is the cross-sectional view of the tool assembly of FIG. 4A in a second position.

Referring to FIGS. 4A and 4B, the spherical member 106 is disposed within the engagement channel 136 of the exposed portion 132 of the shaft 104. The spherical member 106 may have a substantially spherical shape or any other suitable shape. The spherical member 106 is configured to engage the plunger 108. That is, the spherical member 106 is disposed adjacent the plunger 108 and is configured to selectively engage or abut the head portion 160, the intermediate portion 164, and the neck portion 162. For example, the spherical member 106 may be engaged with the head portion 160 in the locked position (FIG. 4A), and the spherical member 106 may be engaged with the neck portion 162 in the unlocked position (FIG. 5).

The spherical member 106 has a diameter $D_{106}$ that is greater than the width $W_{136}$ of the engagement channel 136 at the outer surface 138, such that the spherical member 106 is precluded from exiting the engagement channel 136. However, the diameter $D_{106}$ is sized such that a portion of the spherical member 106 may extend past the outer surface 138 of the exposed portion 132 of the shaft 104, e.g., in the locked position. In the unlocked position, the entirety of the spherical member 106 may be disposed within the outer surface 138 of the exposed portion 132 of the shaft 104. In the unlocked position, a portion of the spherical member 106 may be disposed in the lower channel 128 of the plunger channel 124. The spherical member 106 may be freely disposed within the engagement channel 136. That is, the spherical member 106 may not be tethered or secured to any component. In other implementations, the spherical member 106 may be fixed to one of the housing 102, the shaft 104, the plunger 108, the head 110, or some combination of these components.

In some implementations, the tool assembly 100 may be assembled without the plunger 108. That is, means other than the plunger 108 may selectively move the spherical member 106 between the locked position and the unlocked position. For example, the spherical member 106 may be moved via gravity, a user, mechanical mechanism, an electronic mechanism, an electro-mechanical mechanism, etc. In some implementations, a spring (not shown) may exert a biasing force upon the spherical member 106 to bias the spherical member 106 in a radially outward direction toward the locked position and any suitable mechanism may reduce or eliminate the biasing force to move the spherical member 106 toward the unlocked position or to allow the spherical member 106 to be moved toward the unlocked position.

Referring to FIGS. 4A and 10A-11, the head 110 is configured to be engaged with the exposed portion 132 of the shaft 104. The head 110 may include a main body extending from a first end 111a facing the housing 102 to a second end 111b spaced from the first end 111a. In some implementations, the head 110 may engage the exposed portion 132 via a keyed connection. For example, as can be seen in FIG. 10B, an inner surface 172 of the head 110 defines a recess or opening 174, the inner surface 172 and the opening 174 having a shape resembling the outline of the exposed portion 132, i.e., a "double-D" configuration, such that the head 110 may engage the exposed portion 132 in only two orientations 180 degrees apart from each other. The opening 174 has a length $L_{174}$ and a width $W_{174}$ that are equal to or slightly greater than the length $L_{132}$ and width $W_{132}$, respectively, of the exposed portion 132. The head 110 may include a flare 176 surrounding the opening 174 to aid in locating the head 110 around the exposed portion 132 of the shaft 104.

Further, the double-D configurations of the inner surface 172 of the head 110 and the outer surface 138 of the exposed portion 132 of the shaft 104 may facilitate rotation of the head 110 consistent with rotation of the shaft 104. That is, the shaft 104 may drive rotation of the head 110 via the keyed connection. In other implementations, the head 110 may be engaged with the exposed portion 132 in any suitable manner, including mechanical fasteners, magnets, electromagnets, etc.

Figure 11:
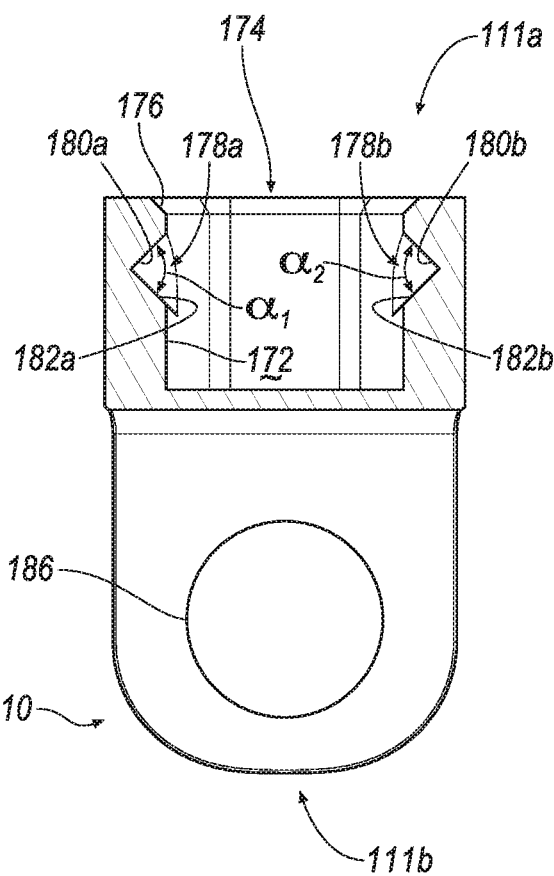
FIG. 11 is a cross-sectional view of the head of FIG. 10A, taken along line 11-11 in FIG. 10B.
Figure 10B:
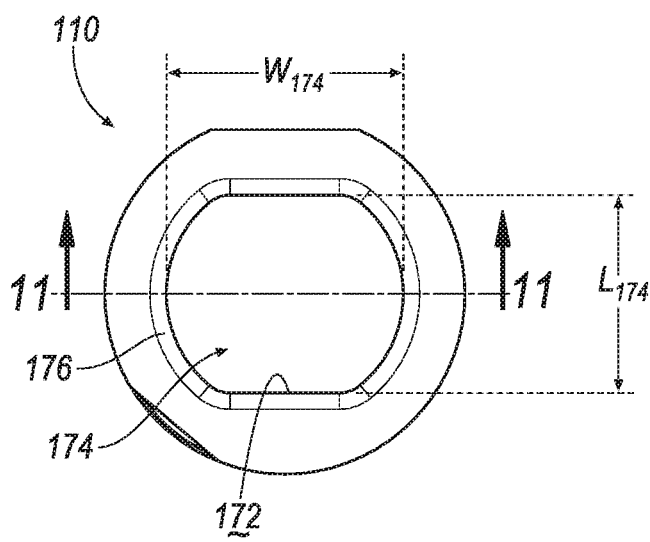
FIG. 10B is a top elevation view of the head of FIG. 10A.

Referring to FIGS. 4A and 11, the inner surface 172 of the head 110 includes at least one detent 178. In some implementations, the inner surface 172 of the head 110 includes a first detent 178a and a second detent 178b opposite the first detent 178a. The detents 178a, 178b are configured to selectively engage or receive the spherical member 106. For example, the detents 178a, 178b may engage or receive the spherical member in the locked position (FIG. 4A). The detents 178a, 178b may include upper engagement surfaces 180a, 180b and lower engagement surfaces 182a, 182b extending transversely from the upper engagement surfaces 180a, 180b. For example, the upper engagement surface 180a may extend from the lower engagement surface 182a at an angle $\alpha_1$, and the upper engagement surface 180b may extend from the lower engagement surface 182b at an angle $\alpha_2$. The angles $\alpha_1$, $\alpha_2$ may be substantially equal to each other or may be different from each other. The angles $\alpha_1$, $\alpha_2$ may be acute, right, or obtuse. That is, the angles $\alpha_1$, $\alpha_2$ may be between 0 and 180 degrees.

In the locked position, the plunger 108 may urge the spherical member 106 in a radially outward direction and the spherical member 106 may simultaneously contact the first upper engagement surface 180a and the first lower engagement surface 182a of the first detent 178a as shown in FIG. 4A. In other implementations, the head 110 may be rotated 180 degrees such that in the locked position, the spherical member 106 may contact the second upper engagement surface 180b and the second lower engagement surface 182b of the second detent 178b. In some implementations, in the locked position, the spherical member 106 may contact, and radially outwardly, urge against, the head 110 at only the engagement surfaces 180a and 182a or 180b and 182b. This arrangement may give rise to a relationship between the head 110 and shaft 104 where there is no, or virtually no, "play" therebetween. This no "play" connection will allow for repeatable placement of the working tool against the medium.

The upper engagement surfaces 180a, 180b engaging with the spherical member 106 may preclude a transverse motion of the head 110 away from the shaft 104. The lower engagement surfaces 182a, 182b engaging with the spherical member 106 may preclude a transverse motion of the head 110 toward the shaft 104. Thus, the engagement of the detents 178a, 178b with the spherical member 106 may effectively secure the head 110 to the shaft 104 in the locked position.

The head 110 may include a slot 184 and at least one aperture 186. The slot 184 may be configured to receive a working tool 188 and the apertures 186 may be configured to receive a fastener 190 to selectively secure the working tool 188 to the head 110. In other implementations, the working tool 188 may be integrally formed with the head 110. That is, the head 110 may be formed by a molding process, and the working tool 188 may be formed with the head 110 via co-molding, overmolding, injection molding, etc., such that the head 110 and the working tool 188 are considered to be a single component. Referring to FIG. 2, the working tool 188 may be a scoring working tool 188a, a cutting working tool 188b, or any other suitable working tool. Each working tool 188 may be fixed to a corresponding head 110 (e.g., a first head 110a and a second head 110b), or each working tool 188 may be interchangeably attached to the same head 110. The relationship between the shaft 104 and the head 110 may allow for multiple heads 110 and, thus, multiple working tools 188, to be attached to the same shaft 104.

Figure 12:
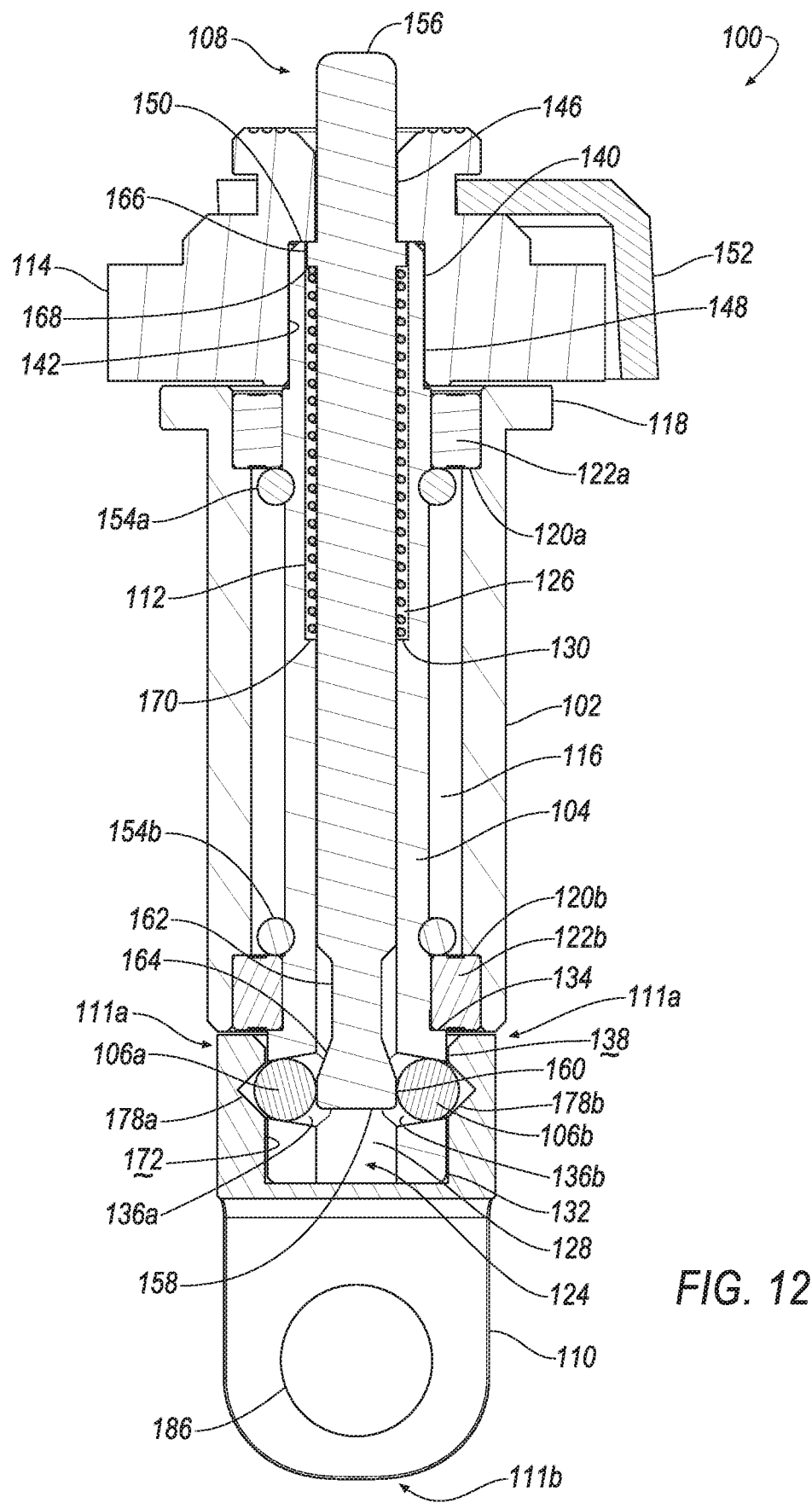
FIG. 12 is a cross-sectional view of another tool assembly of the crafting apparatus of FIG. 1 in accordance with principles of the present disclosure.

Referring to FIG. 12, in some implementations, the shaft 104 may include a first engagement channel 136a and a second engagement channel 136b, and the tool assembly 100 may include a first spherical member 106a and a second spherical member 106b. The engagement channels 136a, 136b may be substantially similar to the engagement channel 136 as described above. The spherical members 106a, 106b may be substantially similar to the spherical member 106 as described above.

Referring to FIGS. 4A and 5, the spring 112 biases the plunger 108 to the locked position. In the locked position, the spherical member 106 is engaged with the head portion 160 of the plunger 108 and wedged between the head portion 160 and the detent 178, the spherical member 106 protruding and extending through the engagement channel 136 at the outer surface 138 of the exposed portion 132. To either remove a head 110 from attachment to the shaft 104 or to attach a head 110 to the shaft 104, the tool assembly 100 must be moved to the unlocked position by moving the plunger 108.

To move the plunger 108 from the locked position to the unlocked position, the input force exerted on the plunger 108 causes the plunger 108 to slide along the plunger channel 124. As the plunger 108 slides along the plunger channel 124, the spherical member 106 starts by engaging the head portion 160 of the plunger 108, then engages the intermediate portion 164 of the plunger 108, and finally engages the neck portion 162 of the plunger 108 in the unlocked position. In the unlocked position, the spherical member 106 is no longer wedged between the head portion 160 and the detent 178, and the spherical member 106 is free to move toward the plunger channel 124. In some implementations, moving the head 110 away from the shaft 104 causes the upper engagement surface 180 to exert a force upon the spherical member 106 and push the spherical member 106 toward the plunger channel 124, as can be seen in FIG. 5. In other implementations, the spherical member 106 in the unlocked position may move toward the plunger channel 124 by any suitable means, e.g., gravity, a user, mechanical mechanism, an electronic mechanism, an electro-mechanical mechanism, etc.

Once the spherical member 106 is entirely within the outer surface 138 of the exposed portion 132 of the shaft 104, the head 110 is unobstructed and may be moved away from the shaft 104, thus removing the head 110 from the shaft 104. Upon removal of the input force, the spring 112 biases the plunger 108 to the locked position and the foregoing process must be repeated in order to either remove a head 110 from attachment to the shaft 104 or to attach a head 110 to the shaft 104.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

A number of implementations have been described. Nevertheless, it will be understood that various modifications may be made without departing from the spirit and scope of the disclosure. Accordingly, other implementations are within the scope of the following claims.

What is claimed is:

1. A tool assembly for a crafting apparatus, the tool assembly comprising:
   a housing defining a shaft channel;
   a shaft rotatably disposed within the shaft channel and including an exposed portion outside of the shaft channel, the exposed portion defining an engagement channel extending through an outer surface of the exposed portion;
   a spherical member disposed within the engagement channel;
   a head configured to be engaged with the exposed portion of the shaft, the head including a detent configured to selectively engage the spherical member;
   a gear configured to drive rotation of the shaft relative to the housing; and
   a shroud only partially surrounding the gear, such that a portion of teeth of the gear are uncovered by the shroud and are exposed to be engageable with other components.

2. The tool assembly of claim 1, further comprising a plunger slidably disposed within a plunger channel defined by the shaft, the plunger being engaged with the spherical member and the plunger channel being connected to the engagement channel.

3. The tool assembly of claim 2, wherein the plunger includes a first portion having a first diameter and a second portion having a second diameter less than the first diameter, the first portion and the second portion being configured to selectively engage the spherical member.

4. The tool assembly of claim 3, wherein when the first portion of the plunger is engaged with the spherical member, a portion of the spherical member extends past the outer surface of the exposed portion of the shaft.

5. The tool assembly of claim 3, wherein when the second portion of the plunger is engaged with the spherical member, the spherical member is disposed within the outer surface of the exposed portion of the shaft.

6. The tool assembly of claim 2, wherein the plunger is operable between a locked position where a portion of the spherical member extends past the outer surface of the exposed portion of the shaft and an unlocked position where the spherical member is disposed within the outer surface of the exposed portion of the shaft.

7. The tool assembly of claim 6, further comprising a spring exerting a biasing force upon the plunger to bias the plunger to the locked position.

8. The tool assembly of claim 7, wherein the plunger is moved from the locked position to the unlocked position in response to a force sufficient to overcome the biasing force of the spring.

9. The tool assembly of claim 1, further comprising a damping member disposed around the shaft, the damping member configured to impede rotation of the shaft.

10. The tool assembly of claim 1, wherein the detent includes two engagement surfaces extending from each other at an angle, and when the detent engages the spherical member, the spherical member simultaneously contacts the two engagement surfaces.

11. The tool assembly of claim 10, wherein when the detent engages the spherical member, the spherical member contacts the head at only the two engagement surfaces.

12. The tool assembly of claim 11, wherein the spherical member exerts a force upon the two engagement surfaces in a radially outward direction, such that the spherical member is wedged between the two engagement surfaces.

13. A tool assembly for a crafting apparatus, the tool assembly comprising:
- a housing;
- a shaft at least partially disposed within the housing, the shaft comprising an exposed portion with a spherical member;
- a head configured to be engaged with the exposed portion, the head including a detent configured to selectively engage the spherical member;
- a gear configured to drive rotation of the shaft relative to the housing; and
- a shroud only partially surrounding the gear, such that a portion of teeth of the gear are uncovered by the shroud and are exposed to be engageable with other components.

* * * * *